United States Patent [19]

Ijichi et al.

[11] 4,152,309

[45] May 1, 1979

[54] PRESSURE-SENSITIVE ADHESIVE COMPOSITION

[75] Inventors: Ichiro Ijichi; Shigetoshi Kai; Hikaru Teranishi; Akira Morioka; Kazuyoshi Seki, all of Ibaraki, Japan

[73] Assignee: Nitto Electric Industrial Company, Ltd., Ibaraki, Japan

[21] Appl. No.: 871,895

[22] Filed: Jan. 23, 1978

Related U.S. Application Data

[63] Continuation-in-part of Ser. No. 642,635, Dec. 19, 1975, abandoned.

[51] Int. Cl.$^2$ .............................................. C08L 93/00
[52] U.S. Cl. ......................... 260/27 BB; 260/18 TN; 260/30.6 R; 260/30.8 R; 260/31.2 N; 260/31.8 M; 260/31.8 T; 260/31.8 Z; 260/32.6 NR; 260/33.6 UB; 260/27 R; 260/841; 260/858; 260/859 R; 528/45; 528/51; 528/57; 528/75
[58] Field of Search ........ 260/18 TN, 30.6 R, 30.8 R, 260/31.2 N, 31.8 M, 31.8 T, 31.8 Z, 32.6 NR, 33.6 UB, 27 R, 27 BB, 841, 858, 859 R, 77.5 AP, 77.5 CR; 528/45, 51, 57, 75

[56] References Cited

U.S. PATENT DOCUMENTS

| | | | |
|---|---|---|---|
| 3,681,277 | 8/1972 | Scholz | 260/24 |
| 3,846,163 | 11/1974 | Kest | 260/27 BB |
| 3,879,248 | 4/1975 | Kest | 260/27 BB |
| 3,932,558 | 1/1976 | Kest | 260/27 BB |

OTHER PUBLICATIONS

Sheist, Handbook of Adhesives, pp. 452–455, Reinhold Publ. Corp., New York, 1963.

*Primary Examiner*—Melvyn I. Marquis
*Attorney, Agent, or Firm*—Sughrue, Rothwell, Mion, Zinn and Macpeak

[57] ABSTRACT

A pressure-sensitive adhesive composition comprising a liquid diene polymer containing therein an average of about 2.0 to about 2.5 functional groups capable of reacting with an isocyanate group, an isocyanate compound containing therein 2 or more isocyanate groups, and a tackifier, wherein an anionic surface active agent is compounded therewith in an amount of about 0.2 to about 10 parts by weight per 100 parts by weight of the total weight of the liquid diene polymer and the isocyanate compound. This pressure-sensitive adhesive composition is coated on a support and heated to produce a pressure-sensitive adhesive layer whereby a pressure-sensitive adhesive tape, for example, can be obtained.

15 Claims, No Drawings

PRESSURE-SENSITIVE ADHESIVE COMPOSITION

CROSS-REFERENCE TO RELATED APPLICATIONS

This application is a continuation-in-part application of U.S. patent application Ser. No. 642,635 filed Dec. 19, 1975, entitled "Pressure-Sensitive Adhesive Composition" and now abandoned.

BACKGROUND OF THE INVENTION

1. Field of the Invention

The present invention relates to a pressure-sensitive adhesive composition which is used for the production of a pressure-sensitive adhesive tape, sheet, or label, etc., and in which no or substantially no organic solvent is used.

2. Description of the Prior Art

Hitherto, a method in which a mixture prepared by adding compounding agents such as a tackifier, a softening agent, a plasticizer, a pigment, etc., to a rubber based or acrylic based polymer is dissolved in an organic solvent, the resulting pressure-sensitive solution containing about 30% by weight of solids is coated on a support such as a plastic sheet, metal foil, etc., in a definite thickness, and then the organic solvent used is evaporated off in a subsequent heating drying step, thereby re-forming an adhesive composed of the above mixture on the support in layer form, has been widely employed to produce pressure-sensitive adhesive tapes, etc.

In accordance with this method, two or more times as much organic solvent as solids is required to be used for the purpose of dissolving the solids constituting the adhesive and to form the adhesive layer. The organic solvent used, however, does not play any role in increasing the pressure-sensitive adhesive properties of the adhesive tape. This method, therefore, suffers from the fault that the use of high amounts of organic solvent requires a heat source and apparatus for evaporating the organic solvent, and apparatus for recovering the organic solvent, thereby increasing the cost of a product.

SUMMARY OF THE INVENTION

The inventors studied the production of pressure-sensitive adhesive tapes, etc., without using any solvent, and, as a result, invented a pressure-sensitive adhesive composition capable of producing a uniform, high quality pressure-sensitive adhesive layer, in which a liquid diene polymer (often called a liquid diene based polymer to emphasize the acceptability of copolymerizing a vinyl monomer therewith to form a copolymer) which is fluid at room temperature is polymerized by reacting with an isocyanate compound on a support upon heating.

One of the features of the present invention resides in the addition of an anionic surface active agent to such an adhesive composition using a liquid diene polymer having a relatively low molecular weight, e.g., an average molecular weight of about 1,000 to about 50,000, which enables unevenness of the adhesive layer in the pressure-sensitive adhesive tapes, etc., to be avoided, thereby providing a uniform, smooth surface, whereby pressure-sensitive adhesive tapes, etc., having excellent properties such as adhesive strength and holding power, etc., can be obtained. More particularly, the present invention is concerned with a pressure-sensitive adhesive composition comprising a liquid diene polymer containing in the molecule thereof functional groups, preferably at both ends thereof, an isocyanate compound which reacts with the liquid diene polymer, thereby causing a polymerization reaction, and a tackifier for providing adhesive strength and tack, wherein an anionic surface active agent is added in an amount of about 0.2 to about 10 parts by weight per 100 parts by weight of the total weight of the liquid diene polymer and the isocyanate compound for the purpose of preventing unevenness (voids caused by heterogeneous portions or spots repelling the composition to result in areas free of tackifier) of an adhesive layer produced at the step of heating, to accelerate the polymerization reaction after coating the composition on a support, and for providing a uniform, smooth adhesive layer.

DETAILED DESCRIPTION OF THE INVENTION

In more detail, where a conventional solution-type pressure-sensitive adhesive composition is coated on a support and then dried upon heating, the viscosity of the coating layer increases with evaporation of the organic solvent. Therefore, voids caused by the support repelling the composition to result in heterogeneous portions or spots free of tackifier in the coating layer do not occur, and a pressure-sensitive adhesive tape having a smooth surface can be obtained.

In accordance with the present invention, the liquid diene polymer which is fluid even at ambient temperatures suffers from the defect that when heated at a temperature of not less than 80° C., the viscosity of a coating layer thereof decreases markedly (for example, to 20 cps at 120° C.), and consequently, the composition is liable to flow and voids occur in the adhesive layer on the support, whereby an adhesive tape having a uniform, smooth adhesive surface cannot be obtained.

This marked reduction in viscosity due to heating is an inherent property of the liquid diene polymer, which deteriorates the appearance of the adhesive tape and causes a reduction in the contact area between the adhesive layer and the surface to which the tape is to be stuck (due to the unevenness of the adhesive layer), thereby reducing important properties such as adhesive strength, retention force, etc.

Thus, attempts to prevent such voids by adding a thickener or high molecular weight polymer material, or selecting special reaction systems or processes have been made, but good results have not been obtained.

As a result of the inventors' investigations from the standpoint of the compatibility of the composition and the surface chemistry thereof, it has been found that the addition of an anionic surface active agent can solve this problem and provide a pressure-sensitive adhesive tape having a uniform, smooth adhesive surface of good adhesive characteristics. Other surface active agents do not provide this effect. This finding permits one to prepare the adhesive composition from a wide variety of liquid diene based polymers, isocyanate compounds, and tackifiers, which is valuable both from the viewpoint of adhesive characteristics and cost, on an industrial scale, and to produce excellent pressure-sensitive adhesive tapes, etc., therefrom.

Liquid diene polymers as are used herein contain in the molecule thereof an average of about 2.0 to about 2.5 functional groups (number average of functional groups based on all liquid diene based polymer present) capable of reacting with an isocyanate group (preferably at least at both ends thereof), and are polymers having a relatively low molecular weight of about 1,000 to about 50,000 and liquid at room temperature.

These liquid diene polymers are homopolymers of diene monomers such as butadiene, isoprene, chloroprene, etc., or copolymers of the above diene monomers and vinyl monomers copolymerizable therewith such as styrene, acrylonitrile, etc., where the vinyl monomer is generally present in an amount of about 5 to about 40% by weight based on the total weight of diene polymer, containing, at both ends of the liquid diene polymer, or in some cases, also in the polymer chain (there are always two terminal functional groups but occasionally a functional group may be present in the polymer chain), functional groups capable of reacting with an isocyanate group, such as —OH, —CH$_2$OH, —COOH, —NH$_2$, —SH, etc.

Many suitable liquid diene based polymers are commercailly available, e.g., Poly B-D R-45 M, CS-15 and CN-15, produced by Arco Chemical Co., Hycar HTB, MTB, CHB and CTB-X, produced by B. F. Goodrich Chemical Co., Nisso PB-G and PB-C, produced by Nippon Soda Co., Ltd., Telagen HT, Prim and CT, produced by General Tire & Rubber Co., Butarez HT and CTL, produced by Phillip Petroleum Co., etc. These liquid diene based polymers can be used alone or as combinations thereof to vary the characteristics required for the pressure-sensitive adhesive.

Preferred liquid diene polymers used in the present invention include Poly B-D-CS-15, a styrene-butadiene copolymer containing about 25 weight % styrene, and having about 2.3 (on the average) —OH functional groups in the molecule thereof, with one —OH group at each end thereof, and having an average molecular weight of 3,600, Poly B-D-CN-15, an acrylonitrile-butadiene copolymer containing an average of about 2.5 —OH functional groups in the molecule thereof and having an —OH group at each end of the copolymer, an acrylonitrile content of about 15% by weight and an average molecular weight of about 5,500, Poly B-D-R-45 M, polybutadiene containing an average of about 2.3 —OH functional groups in the molecule thereof and having a terminal —OH group at both ends thereof and a molecular weight of about 3,000, and Nisso PB-C, polybutadiene containing an average of about 2.15 —COOH functional groups in the molecule thereof and having a terminal —COOH group at each end thereof and a molecular weight of about 1,500.

Isocyanate compounds as are used herein are compounds which react with the functional groups of the above liquid diene based polymer, thereby causing polymerization and, furthermore, cross-linking. While the kind of the isocyanate compound used changes the characteristics of the adhesive layer, those polyisocyanates containing two or more isocyanate groups in the molecule thereof are used in order to cause polymerization and cross-linking.

Examples of such isocyanate compounds include diisocyanates such as p-phenylenediisocyanate, 2,4-tolylenediisocyanate, 1,5-naphthalenediisocyanate, 4,4'-diphenylmethanediisocyanate, 4,4'-diphenylether diisocyanate, hexamethylene diisocyanate, cyclohexane 1,4-diisocyanate, and the like; tri or diisocyanate compounds produced from the above diisocyanate compounds and polyhydroxy compounds such as glycerin, trimethylol propane, polyether glycols, polyester glycols, the latter two materials preferably having a molecular weight of about 600 to about 2,700, and the like, with the urethane bond interposed therebetween, such as Coronate 4099 and 4095, which have molecular weights of 1,050 and 1,400, respectively, produced by Nippon Polyurethane Industry Co., Ltd., Takenate C-1150, produced by Takeda Chemical Industries Ltd.; polyisocyanates such as triphenylmethane triisocyanate, polymethylenepolyphenyl isocyanate, and the like, preferably having a molecular weight of about 100 to about 3,000; and in addition, blocked polyisocyanates produced by reacting the isocyanate groups of such isocyanate compounds and an ROH compound (where R is an aromatic, alicyclic, or aliphatic monovalent group).

The amount of the isocyanate compound added changes depending upon the characteristics required for the pressure-sensitive adhesive. In general, however, the addition of the isocyanate compound in an amount corresponding to about 0.75 to about 1.2 equivalents of the isocyanate group per molar equivalent of the functional group of the liquid diene based polymer yields good results. Below about 0.75 equivalents, the polymerization to produce the pressure-sensitive adhesive proceeds insufficiently, and unreacted liquid diene based polymers remain, thereby causing some adhesive to remain on an object to which the tape has been stuck if the tape is peeled away. On the other hand, above about 1.2 equivalents, the crosslinking reaction proceeds excessively, thereby resulting in a reduction in tackiness and adhesive strength, and thus satisfactory characteristics cannot be obtained.

Tackifiers as are used herein are those compounds which provide tack to the pressure-sensitive adhesive and play a role in increasing adhesive strength. Conventional tackifiers as are usually used in producing general pressure-sensitive adhesive compositions can be used with success in the present invention.

Representative examples of such tackifiers include an alkylphenol resin, a terpene resin, a terpene-phenol resin, a xylene-formaldehyde resin, rosin, a cumarone resin, and, in addition, mixtures of aliphatic and aromatic petroleum resins, etc.

The tackifiers employed in this invention most preferably have a molecular weight range of about 200 to about 1,500, a softening point of about 5° to about 150° C. and are semi-solid or solid at room temperature. Most preferred alkylphenyl resins are those with 1 to 18, preferably 4, carbon atoms in the alkyl moiety thereof. Preferred alkyl phenol resins have a molecular weight of from about 800 to about 1,300, preferred terpene phenol resins have a molecular weight of about 500 to about 1,000, preferred xylene-formaldehyde resins have a molecular weight of from about 800 to about 1,200, preferred rosins have a molecular weight of from about 500 to about 700, and preferred hydrogenated rosins have a molecular weight of from about 500 to about 700.

The addition of the anionic surface active agent, one of the main features of the present invention, enables one to select the tackifier from a wide variety of tackifiers including the above described tackifiers, depending upon the characteristics desired for the pressure-sensitive adhesive tapes, etc., and to determine the amount of the tackifier to be added, within the range of about 10 to about 150 parts by weight per 100 parts by weight of the total weight of the liquid diene based polymer and the isocyanate compound.

As described above, when the composition mainly comprising of one or more liquid diene based polymers, one or more isocyanate compounds, and one or more tackifiers is coated on a support in thin layer form (about 30 to about 50μ thick) and heated to cause polymerization and cross-linking, particle-like voids are produced on the coating layer, thereby resulting in unevenness, i.e., thick areas and areas having substantially no thickness on the support.

Anionic surface active agents as used herein are used for the purpose of overcoming the above described problems and those conventional surface active agents commercially available as anionic surface active agents can be used.

The anionic surface active agent is preferably used in an amount of about 0.2 to about 10 parts by weight per 100 parts by weight of the total weight of the liquid diene based polymer and the isocyanate compound. Where the amount is below about 0.2 part by weight, the effect of preventing voids is poor, whereas where the amount is above about 10 parts by weight, voids can be prevented, but adhesive strength is undesirably reduced.

Hereinafter, representative examples of these anionic surface active agents are shown.

In the following formulae, R, R', and R'' are branched or straight chain hydrocarbons containing 1 to 18 carbon atoms.

Carboxylates represented by the formulae RCH$_2$—COONa and

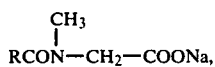

such as a sodium salt of an aliphatic acid (trade name: Nonsal TN-1, produced by Nippon Oils and Fats Co., Ltd.), Oleoilsalcosine (trade name: Oleoilsalcosine 21 P, produced by Nippon Oils and Fats Co., Ltd.); sulfonates represented by the formulae

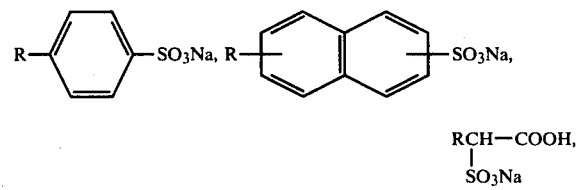

etc., such as sodium dioctylsulfosuccinate (trade name: Lapisol B-80, produced by Nippon Oils and Fats Co., Ltd), sodium dodecylbenzene sulfonate (trade name: Newlex R, produced by Nippon Oils and Fats Co., Ltd; trade name: Lipon P-105, produced by Lion Fat & Oil Co., Ltd.), sodium naphthalene sulfonate (trade name: Lunox S-100, produced by Toho Chemical Industrial Co., Ltd.), etc.; sulfate salts represented by the formulae RR''CHOSO$_3$Na,

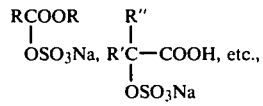

such as sodium sulfates of lauryl alcohol (trade name: Liponol NES and Liponol LL-103, produced by Lion Fat & Oil Co., Ltd.; trade name: Alscope 20413, produced by Toho Chemical Industrial Co., Ltd.), etc.

In addition, phosphoric acid ester salts such as alkyl phosphoric acid diester salts having 1 to 18 carbon atoms in the alkyl moiety thereof (trade name: Elektol 201, produced by Nippon Oils and Fats Co., Ltd.); Gaffac RS-410 (trade name: produced by Toho Chemical Industrial Co., Ltd.), alkylphenol type phosphoric acid diester salt having 1 to 18 carbon atoms in the alkyl moiety thereof (trade name: Gaffac RE-610, produced by Toho Chemical Industrial Co., Ltd.), etc., can be used, although the present invention is not limited to these compounds.

In the present invention, a catalyst can be used in order to accelerate the reaction between the liquid diene based polymer and the isocyanate compound. Suitable catalysts are organic metal salts such as dibutyl tin dilaurate, dioctyl tin dilaurate, tin octenate, cobalt naphthenate, and the like; amines such as N,N,N',N'-tetraethylmethanediamine, 1,4-aza-(2,2,2)bicyclooctane, and the like; and organic acids such as paratoluene sulfonic acid, and the like.

The catalyst is added in an amount of about 0.01 to about 5.0 parts by weight per 100 parts by weight of the liquid diene based polymer. Where the amount is below about 0.01 part by weight, the catalytic effect is poor, whereas if the amount is above about 5.0 parts by weight, the reaction proceeds at room temperature, the viscosity of the compounded composition increases markedly, and uniform coating of the composition on a support becomes difficult.

Furthermore, the composition of the present invention can contain, as desired, a plasticizer or softening agent such as dioctyl phthalate, dibutyl phthalate, polypropylene glycol, polyisobutylene, lanolin, and the like, or additives such as an antioxidant as is conventionally used in pressure-sensitive adhesives, an ultraviolet ray absorbent, a pigment, a filler, and the like. In the case where these additives and starting materials are solid, they can be previously dissolved in a small amount of an organic solvent such as toluene, xylene, n-hexane, etc., in order to produce a uniform layer.

While the present invention is, as described above, concerned with a pressure-sensitive adhesive composition, a method of producing an adhesive tape using this composition will be hereinafter exemplified.

Initially, the predetermined tackifier, anionic surface active agent, and catalyst, and other optional additives are added to the liquid diene polymer, and the resulting mixture is uniformly mixed by the use of a conventional rubber dissolving mixer such as a Banbury mixer, a kneader, etc. It is preferred that the isocyanate compound be added immediately before the resulting composition is coated on the support. When the amount of the mixture is small, the ingredients can be mixed as a batch. However, for a large amount of the mixture, it is preferred that a multi-liquid continuous mixer used in molding urethane foamed materials be used. This is because if a large amount of ingredients are mixed at the same time, the viscosity of the mixed composition increases during coating, and thus coating becomes difficult.

The mixed composition is then coated on a support such as a paper, cellophane, plastic sheet, etc., directly or with an undercoating layer interposed therebetween, by any conventional coating means, e.g., with a reverse coater, a kiss coater, a knife coater, or an extruder, etc., and the assembly then introduced into a heating means.

In general, upon reaction of the coating layer at about 100° to about 180° C. for about 40 seconds to about 5 minutes, the coating layer on the support is substantially completely reacted, whereby a pressure-sensitive adhesive layer free of fluidity, stringing and sticking of the adhesive to a roll is obtained.

Subsequently, the thus obtained member is wound up in the form of roll, which is slit as it is, or after being stored overnight at a temperature of not more than 60° C. to accelerate the reaction if the reaction is not completed, whereby a pressure-sensitive adhesive tape is obtained.

The fact that the kind of anionic surface active agents play an important role in providing a pressure-sensitive adhesive composition capable of producing a uniform, smooth adhesive layer will be exemplified by reference to the following non-limiting examples, wherein all parts are by weight unless otherwise stated.

EXAMPLE 1

100 parts of a liquid diene polymer, polybutadiene containing a —COOH group at each end thereof and having an average molecular weight of 1,500 (produced by Nippon Soda Co., Ltd., under the trade name of Nisso PB-C), and 70 parts of a terpene resin (produced by Pennsylvania Industrial Chemical Corp. under the trade name of Piccolyte A-115) were mixed in a kneader. In addition, 11.5 parts of diphenylmethane diisocyanate, 0.05 part of cobalt naphthenate, and 0.5 part of each of the anionic, cationic, nonionic, and amphoteric surface active agents shown in Table 1 were added to prepare various compositions. These various compositions were coated on a 150μ thick plasticized polyvinyl chloride (produced by Mitsubishi Monsanto Co., Ltd.) sheet at a thickness of about 30μ (dry basis), and then heated at 120° C. for 2 minutes and wound up in the form of a roll to produce samples.

The properties and characteristics of these samples as pressure-sensitive adhesive tapes were evaluated by the following evaluation methods. The results obtained are shown in Table 1.

PROGRESS OF POLYMERIZATION REACTION

This test was conducted to evaluate to what extent the coating layer coated on the support undergoes polymerization upon heating, and if the coating layer is satisfactorily converted into a pressure-sensitive adhesive layer. First, it waw determined if, when pressed with a finger, the adhesive stuck to the finger. Secondly, it was determined if a sample whose adhesive layer was stuck to a stainless steel plate could be peeled off without leaving any adhesive on the stainless steel plate.

o: Polymerization proceeds sufficiently; no adhesive layer remains on a finger or the stainless steel plate Δ: Adhesive layer somewhat remains on a finger or the stainless steel plate x: Polymerization proceeds insufficiently; the adhesive layer remains on a finger or the stainless steel plate, or stringing of the adhesive layer is caused.

STATE OF ADHESIVE LAYER

The adhesive layer was visually examined to see if the adhesive layer was formed on the support in a uniform thickness or evenly, or if particle-like unevenness (voids caused by the support repelling the adhesive layer) were formed on the adhesive layer.

o: Adhesive layer whose entire surface was smooth, having a uniform thicness

Δ: 10 or less voids of a diameter of 2 mm or less present per square meter x: More than 10 voids of a diameter of 2 mm or less present per square meter; or voids of a diameter of more than 2 mm were present.

ADHESIVE STRENGTH

The sample was slit into 20 mm widths and adhered to a stainless steel plate having a mirror surface, pressed by applying a load of 2 kg with a roll and peeled off at a peeling rate of 300 mm/min with force parallel to the stainless steel plate. The 180° peeling force at this time was measured at a temperature of 20° C. with a Tensilon Measure produced by Toyo Measuring Instrument Co., Ltd.

COHESIVE FORCE

This term designates the holding power of the pressure-sensitive adhesive tape. The sample was slit to a definite area (in this case, 1×2 cm) and stuck to a support (a Bakelite plate). While pressing by applying a load of 1 kg with a roll, a definite load (in this case, 300 g) was applied parallel to the support at 20° C. for 1 hour, and then the distance deviated was measured. Of course, the sample whose distance deviated was small has high holding power, and is considered to be an excellent pressure-sensitive adhesive tape.

TABLE 1

| Run No. | Surface Active Agent | | | | Progress of Polymerization | State of Adhesive Layer | Adhesive Strength (g/20mm width) | Cohesive* Force (mm/hr) |
|---|---|---|---|---|---|---|---|---|
| | | Type | Trade Name | Supplier | | | | |
| 1 | Anionic | Sodium salt of fatty acid | Nonsal DK | *1 | o | o - Δ | 480 | 0.32 |
| 2 | " | Sodium sulfonate | Newlex R | *1 | o | o | 420 | 0.45 |
| 3 | " | Sodium sulfonate | Neocol P | *2 | o | o | 390 | 0.52 |
| 4 | " | Alcohol sulfate | Liponol LL-103 | *3 | o | o | 450 | 0.64 |
| 5 | " | Phosphoric acid diester salt | Gaffac RS-410 | *4 | o | o | 450 | 0.45 |
| 6 | Cationic | Amines (main components) | Nimine S-204 | *1 | o | x | 230 | 2.5 |
| 7 | " | Quaternary ammonium | Catinol HB | *4 | o - Δ | x | 280 | 3.6 |
| 8 | Nonionic | Ethers (main components) | Nonion E-220 | *1 | x | x | 120 | Dropped in 2 min. |
| 9 | " | Alkylphenol | Nonion NS-210 | *1 | x | x | 250 | Dropped in 5 min. |
| 10 | " | Esters (main components) | Nonion P-10 | *1 | Δ - x | x | 300 | Dropped in 25 min. |
| 11 | Amphoteric | Imidazoline derivatives | Ovasolin 40A | *4 | Δ | x | 290 | 150 |
| 12 | " | Amine and aliphatic acid | Anon BF | *1 | x | x | 110 | Dropped in 7 min. |
| 13 | " | Alanin | Liponin LA | *3 | x | x | 210 | Dropped |

TABLE 1-continued

| Run No. | Surface Active Agent | | | Progress of Polymerization | State of Adhesive Layer | Adhesive Strength (g/20mm width) | Cohesive* Force (mm/hr) |
| --- | --- | --- | --- | --- | --- | --- | --- |
| | Type (main components) | Trade Name | Supplier | | | | |
| 14 | No addition | — | — | Δ | x | 290 | in 5 min. 7.5 |

*The figures represents the distance the sample moved down along the surface to which the sample was stuck in one hour.

List of Suppliers
*1 Nippon Oils & Fats Co., Ltd.
*2 Daiichi Kogyo Seiyaku Co., Ltd.
*3 Lion Fat & Oil Co., Ltd.
*4 Toho Chemical Industrial Co., Ltd.

In Run Nos. 1, 2, 3, 4, and 5, a sodium salt of a fatty acid, sodium sulfonate, alcohol sulfate, and phosphate based anionic surface active agents were used. Samples produced using these anionic surface active agents were good in progress of the polymerization reaction and the state of adhesive layer, and furthermore, pressure-sensitive adhesive tapes obtained therefrom were similar in adhesive strength and cohesive force to the plasticized polyvinyl chloride adhesive tape on the market.

On the other hand, in samples where a cationic, nonionic or amphoteric surface active agent (other than an anionic surface active agent) was used, circular voids of a diameter of 1 to 5 mm were produced on the whole surface. The interior of the voids was such that the adhesive did not stick, and areas were found where product appearance was poor and the polymerization reaction proceeded insufficiently.

EXAMPLE 2

To 50 parts of a liquid diene polymer (styrene-butadiene copolymer containing an —OH group at each end thereof and having an average molecular weight of 3,600; trade name: Poly B-D CS-15, produced by Arco Chemical Co.) and 50 parts of a liquid diene polymer (polybutadiene containing an —OH group at each end thereof and having an average molecular weight of 3,000; trade name: Poly B-D R-45 M, produced by Arco Chemical Co.) were added 75 parts of 90% toluene solutions of various tackifiers as shown in Table 2, 0.5 part of dibutyl tin laurate as a catalyst, 1.0 part of Antioxidant (produced by Allied Chemical Co.) as an antioxidant, and 45 parts of a polyether diisocyanate (trade name: Coronate 4095, produced by Nippon Polyurethane Industry Co., Ltd.). To one part of the resulting mixture there was added 0.5 part of an anionic surface active agent (trade name: Newlex R, produced by Nippon Oils and Fats Co., Ltd.) while to a second part of the resulting mixture the anionic surface active agent was not needed to produce two sets of compositions.

These compositions were coated on a 150μ thick plasticized polyvinyl chloride sheet in a thickness of about 30μ (dry basis) using a reverse coater, and the assembly thereafter heated at 140° C. for 1.5 minutes to produce Samples 1a to 6b as shown in Table 2.

With these samples, the progress of the polymerization, the state of the adhesive layer, the adhesive strength and the cohesive force as a pressure-sensitive adhesive tape were measured as in Example 1. The results obtained are also shown in Table 2.

As a result, it was confirmed that with Samples 1b to 6b in which the anionic surface active agent was used, a smooth, void-free adhesive layer was formed, and the properties thereof as a pressure-sensitive adhesive tape were good.

TABLE 2

| Run No. | Tackifier | | Surface Active Agent Present | Progress of Polymerization | State of Adhesive Layer | Adhesive Strength (g/20mm width) | Cohesive Force (mm/hr) |
| --- | --- | --- | --- | --- | --- | --- | --- |
| | Type | Trade Name (Supplier) | | | | | |
| 1 a | Xylene-formaldehyde Resin | Nikanol H (Mitsubishi Gas Chemical Industries Ltd.) | No | Δ | Δ | 300 | 4.02 |
| 1 b | | | Yes | o | o | 480 | 0.53 |
| 2 a | Cumarone Resin | Cumarone BM (Nippon Steel Corp.) | No | x | x | 280 | Dropped in 25 min. |
| 2 b | | | Yes | o | o | 450 | 1.27 |
| 3 a | Aromatic Petroleum Resin | Hiresin 60 (Toho Petroleum Resin Co., Ltd.) | No | x | x | 220 | Dropped in 25 min. |
| 3 b | | | Yes | o | o | 470 | 1.07 |
| 4 a | Terpene Resin | YS Resin 115 (Yasuhara Yushi Kogyo Co., Ltd.) | No | x | x | 200 | Dropped in 10 min. |
| 4 b | | | Yes | o | o | 560 | 0.44 |
| 5 a | Terpene-phenol Resin | T-115 (Yasuhara Yushi Kogyo Co., Ltd.) | No | Δ | Δ | 350 | 0.92 |
| 5 b | | | Yes | o | o | 520 | 0.55 |
| 6 a | Same as above | Sumilite PR 10603 (Sumitomo Durez Co., Ltd.) | No | Δ | Δ | 310 | 0.62 |
| 6 b | | | Yes | o | o | 450 | 0.58 |

EXAMPLE 3

To 100 parts of a liquid diene based polymer (styrene-butadiene copolymer containing an —OH group at each end thereof and having an average molecular weight of 3,600; trade name: Poly B-D CS-15) and 9.8 parts of tolylene diisocyanate were added 50 parts of a terpene phenol resin (tradename: T-115; produced by Yasuhara Yushi Kogyo Co., Ltd.), and a 90% toluene solution of 50 parts of an aromatic petroleum resin (trade name: Hiresin 60, produced by Toho Petroleum Resin Co., Ltd.). When this mixture was uniformly mixed, 0.5 part of tin octylate was added thereto and further stirring-mixing was conducted at room temperature.

The resulting mixture was divided into several portions. To each of these portions was added a sulfonic acid soda based anionic surface active agent (trade name: Neocol P, produced by Daiichi Kogyo Seiyaku Co., Ltd.) to produce adhesive compositions, i.e., compositions in which the anionic surface active agent was added in an amount of 0, 0.1, 0.2, 0.5, 1.0, 5, 10, or 15 parts per 100 parts of the total weight of the liquid polymer and the isocyanate compound were produced.

These compositions were then coated on a 150μ thick plasticized polyvinyl chloride sheet (produced by Mitsubishi Monsanto Co., Ltd.) with a conventional applicator, and heated at 120° C. for 5 minutes to produce Samples 15 to 22.

With these samples, the progress of the polymerization, the state of the adhesive layer, and the properties as a pressure-sensitive adhesive layer were evaluated as in Example 1. The results obtained are shown in Table 3. As is apparent from the results, the sample in which no surface active agent was used did not have a smooth adhesive layer and had poor tape properties such as adhesive strength, etc. On the other hand, the samples in which the surface active agent was added in an amount of more than 0.2 part had a smooth adhesive layer and exhibited good properties as a pressure-sensitive adhesive tape.

However, the addition of the surface active agent in an amount of more than 10 parts reduces adhesive strength and provides undesirable pressure-sensitive adhesive tapes.

100 parts by weight of the total weight of said liquid diene polymer and isocyanate compound, said anionic surface active agent being selected from the group consisting of (a) carboxylates represented by the formulae
RCH$_2$—COONa and

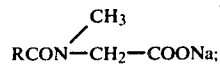

(b) sulfonates represented by the formulae

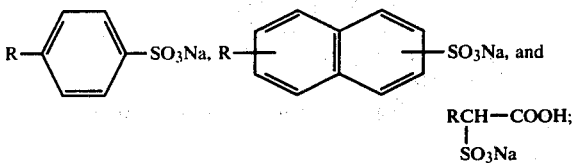

(c) sulfate salts represented by the formulae

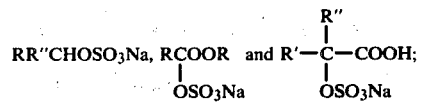

(d) alkyl phosphoric acid diester salts having 1 to 18 carbon atoms in the alkyl moiety thereof; and
(e) alkylphenol type phosphoric acid diester salts having 1 to 18 carbon atoms in the alkyl moiety thereof wherein R, R' and R" are branched or straight chain hydrocarbons having 1 to 18 carbon atoms.

2. The pressure-sensitive adhesive composition according to claim 1, wherein the liquid diene polymer is liquid at room temperature and has a molecular weight

TABLE 3

| Run No. | Parts of Surface Active Agent Added | Progress of Polymerization | State of Adhesive Layer | Adhesive Strength (g/20 mm width) | Cohesive Force (mm/hr) |
| --- | --- | --- | --- | --- | --- |
| 15 | 0 (no addition) | Δ - x | x | 130 | Dropped in 15 min. |
| 16 | 0.1 | Δ | Δ | 250 | 10.8 |
| 17 | 0.2 | o | o | 480 | 0.64 |
| 18 | 0.5 | o | o | 490 | 0.24 |
| 19 | 1.0 | o | o | 480 | 0.21 |
| 20 | 5.0 | o | o | 420 | 0.32 |
| 21 | 10.0 | o | o | 350 | 0.51 |
| 22 | 15 | o | o | 300 | 0.74 |

While the invention has been described in detail and with reference to specific embodiments thereof, it will be apparent to one skilled in the art that various changes and modifications can be made therein without departing from the spirit and scope thereof.

What is claimed is:
1. A pressure-sensitive adhesive composition for producing a pressure-sensitive adhesive, the pressure-sensitive adhesive composition comprising
(i) a liquid diene polymer containing in the molecule thereof an average of about 2.0 to about 2.5 functional groups capable of reacting with an isocyanate,
(ii) an isocyanate compound containing therein 2 or more isocyanate groups in the molecule thereof, and
(iii) a tackifier,
wherein an anionic surface active agent (iv) is present in an amount of about 0.2 to about 10 parts by weight per of from about 1,000 to about 50,000.

3. The pressure-sensitive adhesive composition according to claim 1, wherein the liquid diene polymer contains one or more functional groups selected from the class consisting of —OH, —CH$_2$OH, —COOH, —NH$_2$ and —SH.

4. The pressure sensitive adhesive composition according to claim 1, wherein the isocyanate compound is selected from the group consisting of diisocyanates, diisocyanate or triisocyanate compounds produced from diisocyanates and polyhydroxy compounds, or blocked polyisocyanates produced by reacting the isocyanate groups of the preceding isocyanate compounds with a compound of the formula ROH, wherein R is an aromatic alicyclic or aliphatic monovalent group.

5. The pressure-sensitive adhesive composition according to claim 4, wherein said isocyanate compound is present in an amount of about 0.75 to about 1.2 equivalents of the isocyanate group per equivalent of the functional group of the liquid diene polymer.

6. The pressure-sensitive adhesive composition according to claim 1, wherein the tackifier is selected from the group consisting of an alkylphenol resin, a terpene phenol resin, a xylene-formaldehyde resin, rosin, and hydrogenated rosin.

7. The pressure-sensitive adhesive composition according to claim 1, wherein the composition further contains a catalyst in an amount of about 0.01 to about 5.0 parts by weight per 100 parts by weight of the liquid diene polymer.

8. The pressure-sensitive adhesive composition according to claim 1, wherein the liquid diene polymer is selected from the group consisting of a homopolymer of butadiene, isoprene or chloroprene or a copolymer of butadiene, isoprene or chloroprene and a vinyl monomer copolymerizable therewith.

9. The pressure-sensitive adhesive composition according to claim 8, wherein said vinyl monomer is styrene or acrylonitrile.

10. The pressure-sensitive adhesive composition according to claim 8, wherein said liquid diene polymer is said copolymer and wherein said vinyl monomer is present in an amount of about 5 to about 40% by weight based on the total weight of the diene polymer.

11. The pressure-sensitive adhesive composition according to claim 1, wherein said anionic surface active agent is selected from the group consisting of (a) carboxylates represented by the formulae

(b) sulfonates represented by the formulae

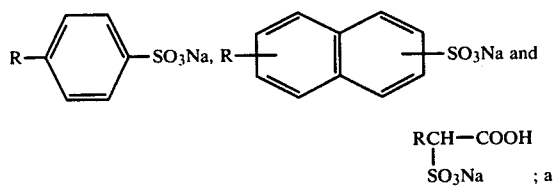

; and (c) sulfate salts represented by the formulae

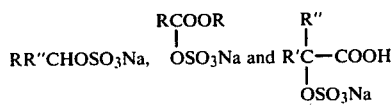

wherein R, R' and R" are branched or straight chain hydrocarbons having 1 to 18 carbon atoms.

12. The pressure-sensitive adhesive composition according to claim 1, wherein said anionic surface active agent is selected from the group consisting of sodium dioctylsulfosuccinate, sodium dodecylbenzene sulfonate, sodium naphthalene sulfonate and the sodium sulfate of lauryl alcohol.

13. A pressure-sensitive adhesive comprising the following pressure-sensitive adhesive composition which has been heated to about 100° to about 180° C. for about 40 seconds to about 5 minutes:

(i) a liquid diene polymer containing in the molecule thereof an average of about 2.0 to about 2.5 functional groups capable of reacting with the isocyanate, (ii) an isocyanate compound containing therein 2 or more isocyanate groups in the molecule thereof, and (iii) a tackifier, wherein an anionic surface active agent (iv) is present in an amount of about 0.2 to about 10 parts by weight per 100 parts by weight of the total weight of said liquid diene polymer and isocyanate compound, said anionic surface active agent being selected from the group consisting of (a) carboxylates represented by the formulae

(b) sulfonates represented by the formulae

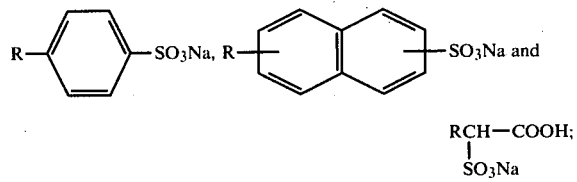

(c) sulfate salts represented by the formulae

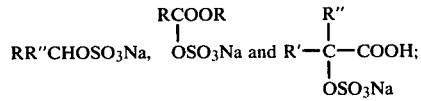

(d) alkyl phosphoric acid diester salts having 1 to 18 carbon atoms in the alkyl moiety thereof; and (e) alkylphenol type phosphoric acid diester salts having 1 to 18 carbon atoms in the alkyl moiety thereof wherein, R, R' and R" are branched or straight chain hydrocarbons having 1 to 18 carbon atoms.

14. The pressure-sensitive adhesive of claim 13, wherein said anionic surface active agent is selected from the group consisting of (a) carboxylates represented by the formulae

(b) sulfonates represented by the formulae

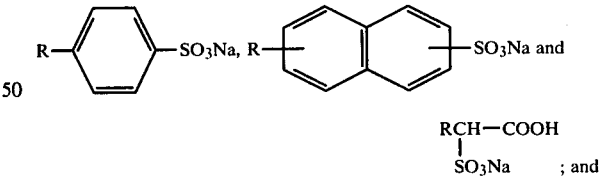

; and (c) sulfate salts represented by the formulae

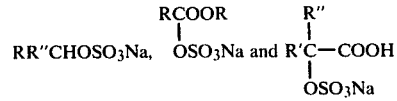

wherein R, R' and R" are branched or straight chain hydrocarbons having 1 to 18 carbon atoms.

15. The pressure-sensitive adhesive of claim 13, wherein said anionic surface active agent is selected from the group consisting of sodium dioctylsulfosuccinate, sodium dodecylbenzene sulfonate, sodium naphthalene and the sodium sulfate of lauryl alcohol.